US007040434B2

(12) United States Patent
Komiyama et al.

(10) Patent No.: US 7,040,434 B2
(45) Date of Patent: May 9, 2006

(54) ENGINE SPEED CONTROL FOR A HYBRID ELECTRIC VEHICLE

(75) Inventors: Susumu Komiyama, Yokohama (JP);
Taketora Negome, Yokohama (JP);
Hiroshi Iwano, Yokohama (JP);
Hideaki Inoue, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/964,892

(22) Filed: Oct. 15, 2004

(65) Prior Publication Data
US 2005/0109551 A1      May 26, 2005

(30) Foreign Application Priority Data
Oct. 16, 2003    (JP)    ............................. 2003-356511

(51) Int. Cl.
*B60K 1/00*    (2006.01)
(52) U.S. Cl. ....................... 180/65.2; 701/22
(58) Field of Classification Search ............... None
See application file for complete search history.

(56) References Cited

U.S. PATENT DOCUMENTS

| | | | |
|---|---|---|---|
| 5,914,575 A * | 6/1999 | Sasaki ................... 318/150 |
| 6,625,525 B1 * | 9/2003 | Yoshino et al. .......... 701/22 |
| 6,691,809 B1 * | 2/2004 | Hata et al. ............. 180/65.3 |
| 6,758,293 B1 * | 7/2004 | Kayukawa et al. ...... 180/65.2 |
| 6,819,985 B1 * | 11/2004 | Minagawa et al. ....... 701/22 |

FOREIGN PATENT DOCUMENTS

JP    2001-164960 A    6/2001

OTHER PUBLICATIONS

Amano et al., Japanese Patent Application Publication 2000-166022 A, Jun. 6, 2000.*
Endo et al., Japanese Patent Application Publication 2001-112115, Apr. 20, 2001.*
Yoshino et al. Japanese Patent Application Publication 2001-200741, Jul. 27, 2001.*

* cited by examiner

*Primary Examiner*—Christopher P. Ellis
*Assistant Examiner*—Christopher Bottorff
(74) *Attorney, Agent, or Firm*—Foley & Lardner LLP

(57) ABSTRACT

A hybrid vehicle comprises a drive wheel (5), an internal combustion engine (1), a power generating motor (2) that generates an electric power by using an output power of the engine (1), and a planetary gear set (13) that comprises a combination of a gear element that is driven by the engine (1), a gear element that is connected to the power generating motor (2), and a gear element that is connected to the drive wheel (5). A target engine power is computed based on an accelerator operation amount. The engine (1) is controlled based on the target engine power. And control a rate of variation in the rotation speed of the engine (1) to be smaller, when the rotation speed of the power generating motor (2) increases than when the rotation speed of the power generating motor (2) decreases toward zero as a result of controlling the engine (1) based on the target engine power. Fuel consumption rate is thus improved.

6 Claims, 10 Drawing Sheets

ENGINE SPEED CONTROL FOR A HYBRID ELECTRIC VEHICLE

FIELD OF THE INVENTION

This invention relates to engine speed control for a hybrid electric vehicle in which an internal combustion engine and a motor are mounted.

BACKGROUND OF THE INVENTION

Changes in engine speed due to frequent, quick application or release of an accelerator leads to excess energy consumption in a hybrid electric vehicle having an internal combustion engine and a motor.

With a hybrid electric vehicle disclosed in JP 2001-164960 A, published by the Japan Patent Office in 2001, wasteful energy consumption is suppressed by delaying the response speed for the engine speed to prevent frequent changes in transient operating states where the required drive force increases. The drive force by the motor is increased instead of increasing an engine output power providing that the state of charge of battery, namely the electric power capable of being output by the battery, is large. By supplementing the drive force by the motor, the response speed for the engine speed can be delayed. However, when the state of charge of battery is small, it is necessary to quicken the response of the engine speed, because the motor cannot supplement the drive force. Accordingly, the response speed for the engine speed is delayed according to the state of charge of battery.

SUMMARY OF THE INVENTION

However, when considered from the point of energy efficiency of the entire hybrid electric vehicle, even if the state of charge of battery is large, it is not necessarily a good idea to delay the response speed for the engine speed. In other words, when the response speed for the engine speed is delayed by changing the motor output power charge and discharge losses of the battery may occur. Further, when an engine operating state moves from a state with conspicuously poor fuel consumption to a state having good fuel consumption, quickly changing the engine operating state can suppress fuel consumption without delaying the engine speed response.

The fuel consumption of the hybrid electric vehicle is thus determined by a complex interaction of efficiencies for each element that comprises a hybrid drive system. Consequently, the amount of fuel consumption cannot always be suppressed by only delaying the response speed of the engine speed as described above.

It is therefore an object of this invention to achieve engine speed control of a hybrid electric vehicle with which fuel consumption can be reliably reduced.

In order to which achieve the above object, this invention provides a hybrid electric vehicle comprises a drive wheel, an internal combustion engine, a power generating motor that generates an electric power by using an output power of the engine, a planetary gear set comprising a combination of a gear element that is driven by the engine, a gear element that is connected to the power generating motor, and a gear element that is connected to the drive wheel, an accelerator position sensor that detects a depression amount of an accelerator pedal, and a programmable controller. The programmable controller is programmed to compute a target axle drive torque based on the depression amount of the accelerator pedal, compute a target engine power based on the target axle drive torque, control the engine based on the target engine power, and control a rate of variation in the rotation speed of the engine to be smaller, when the rotation speed of the power generating motor is increasing than when the rotation speed of the power generating motor is decreasing toward zero as a result of controlling the engine based on the target engine power.

The details as well as other features and advantages of this invention are set forth in the remainder of the specification and are shown in the accompanying drawings.

DETAILED DESCRIPTION OF THE PREFERRED EMBODIMENTS

Figure 1:
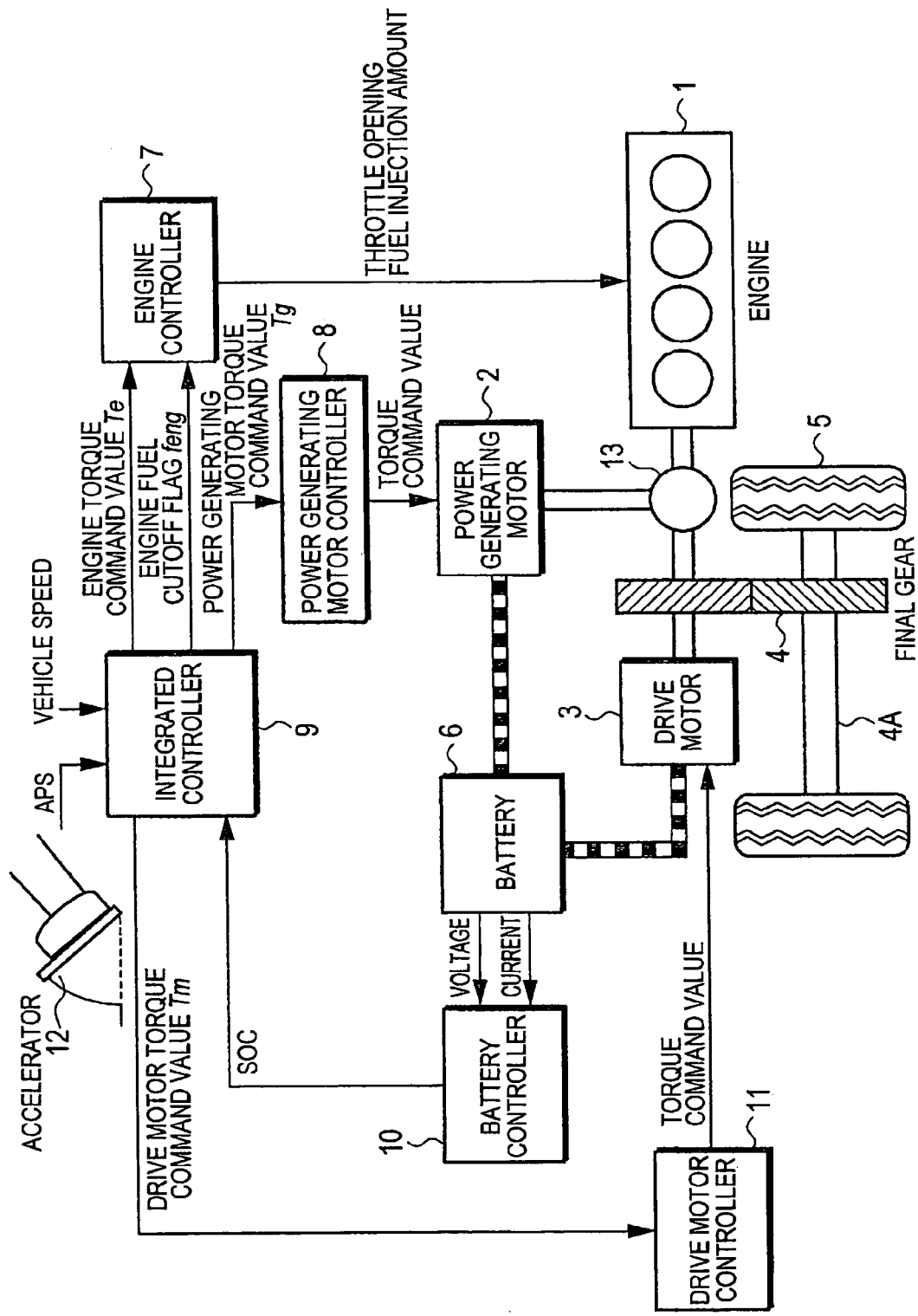
FIG. 1 is a schematic diagram of a first embodiment of a hybrid electric vehicle according to this invention.

Referring to FIG. 1 of the drawings, a power train of a hybrid electric vehicle comprises an internal combustion engine 1, a power generating motor 2, and a drive motor 3 each of which is mechanically connected to a planetary gear set 13.

In order to control the power train, the hybrid electric vehicle comprises an engine controller 7, a power generating motor controller 8, an integrated controller 9, a battery controller 10, and a drive motor controller 11.

The battery controller 10 detects a charging/discharging voltage value and a current value of a battery 6, computes a state of charge (hereinafter abbreviated as SOC), and outputs the SOC to the integrated controller 9.

The integrated controller 9 outputs control signals to the engine controller 7, the power generating motor controller 8, and the drive motor controller 11. The output signals are determined based on an accelerator position signal (hereinafter abbreviated as APS) from an accelerator position sensor 15 that detects the position to which an accelerator pedal 12 is depressed, a speed signal from a vehicle speed sensor 14, and the SOC.

The engine controller 7 regulates a throttle opening of the engine 1 and an amount of fuel injection, controlling engine torque, based on engine torque command values that are output from the integrated controller 9.

The power generating motor controller 8 controls an output torque from the power generating motor 2 based on power generating motor torque command values that are output form the integrated controller 9.

The drive motor controller 11 controls the size and the rotation direction of torque from the drive motor 3 based on drive motor torque command values that are output from the integrated controller 9.

Figure 2:
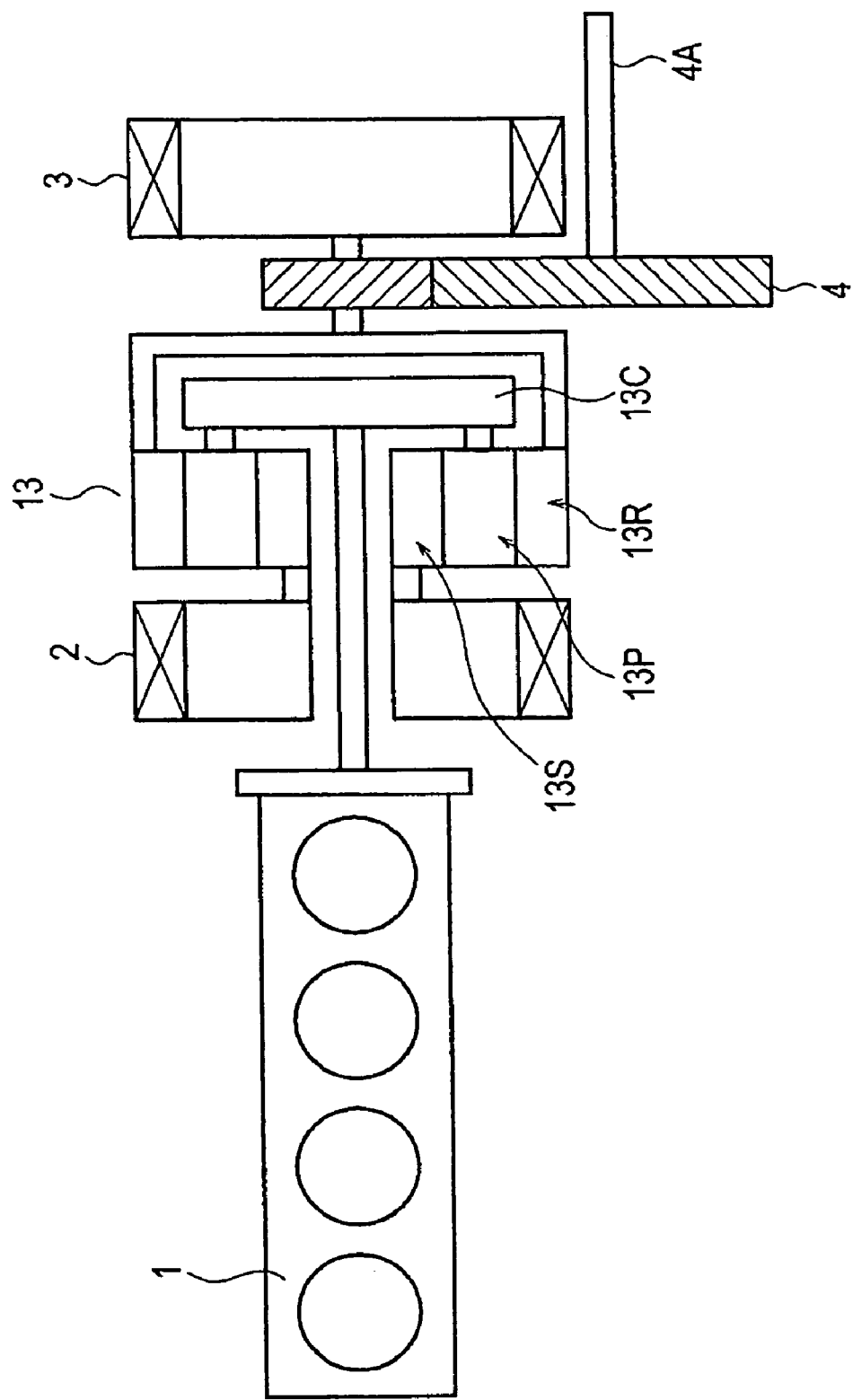
FIG. 2 is a schematic diagram of a planetary gear set used in the first embodiment of this invention.

Referring to FIG. 2, the planetary gear set 13 comprises a sun gear 13S, a ring gear 13R, a plurality of pinion gears 13P that mesh with the sun gear 13S and the ring gear 13R, and a carrier 13C that supports the pinion gears 13P. The carrier 13C is connected to the engine 1. The sun gear 13S is connected to the power generating motor 2. The ring gear 13R is connected to the drive motor 3. Further, the ring gear 13R is also connected to drive wheels 5 of the vehicle through a final gear 4 and a drive shaft 4A as shown in FIG. 1.

Figure 3:
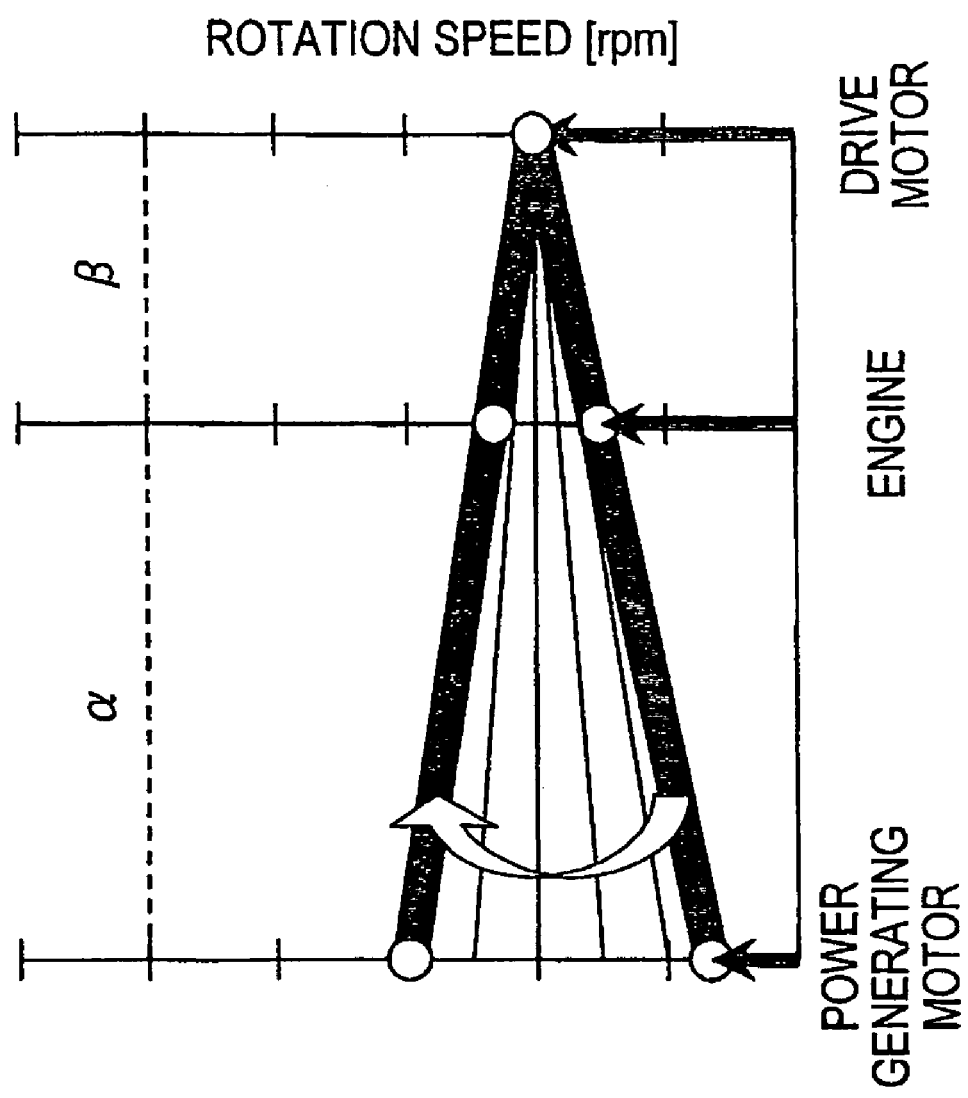
FIG. 3 is a collinear diagram that shows relationships between rotating speeds of an engine, a power generating motor, and a drive motor according to the first embodiment of this invention.

Referring to a collinear diagram of FIG. 3, the rotating speeds of the engine 1, the power generating motor 2, and the drive motor 3 have relationships as shown in the figure when they are connected to the planetary gear set 13. The rotation speed of the engine 1 is controlled based on the rotation speed of the power generating motor 2. $\alpha$ in FIG. 3 denotes a gear ratio of the sun gear 13S with respect to the pinion gear 13P. $\beta$ in FIG. 3 denotes a gear ratio of the ring gear 13R with respect to the pinion gear 13P.

Figure 4:
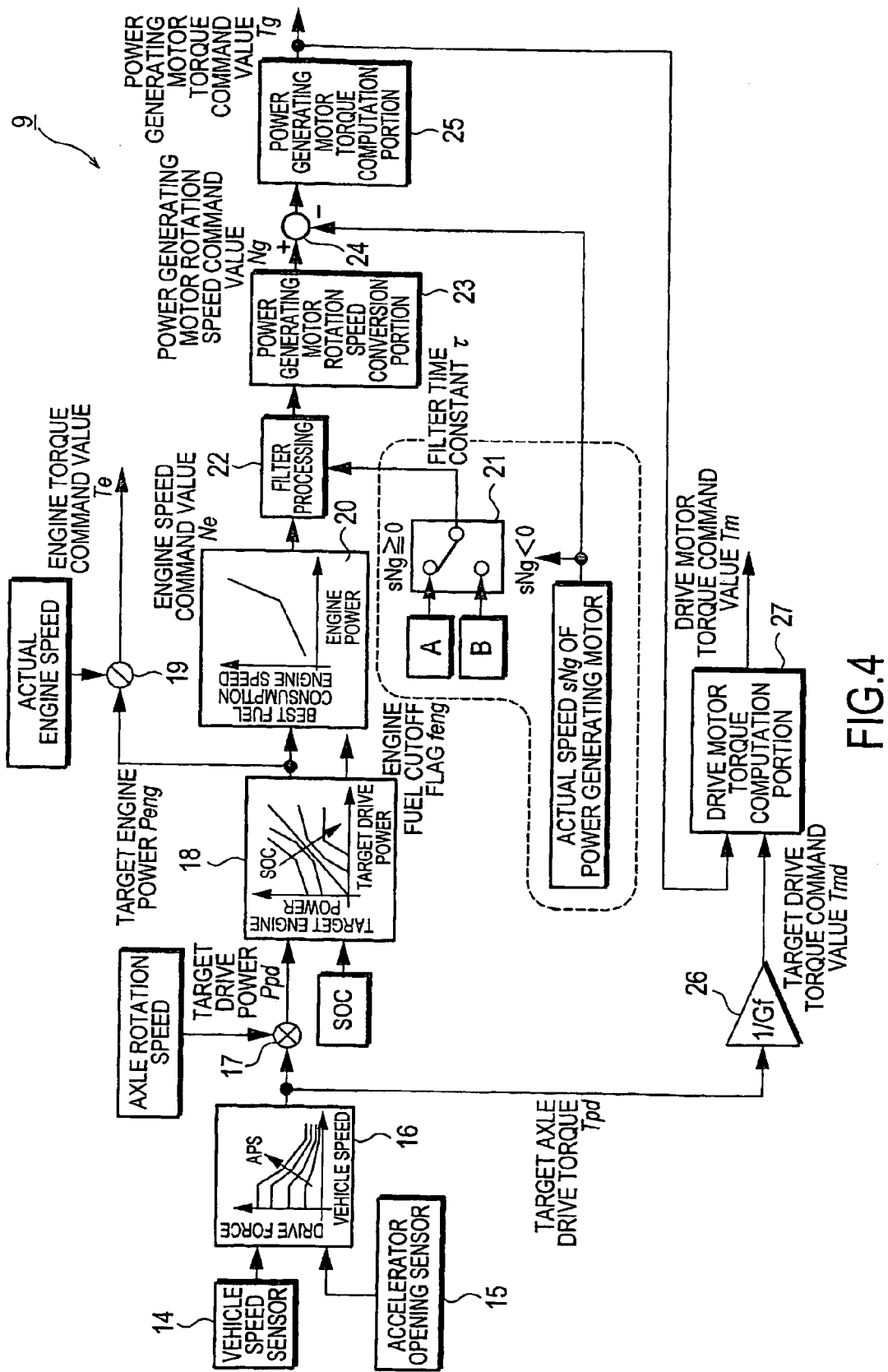
FIG. 4 is a block diagram which explains control functions of an integrated controller according to the first embodiment of this invention.

FIG. 4 is a control block diagram of the integrated controller 9. The integrated controller 9 repeatedly performs control for fixed periods of 10 milliseconds.

The respective parts in the figure are virtual parts for the purpose of describing the functions of the integrated controller 9 and do not exist as physical entities. Referring to the figure, a target axle drive torque computation part 16 comprises a shaft drive force map. Relationships between vehicle speed and drive force are provided in advance in the axle drive force map for different amounts of accelerator operation. A target drive force is found by referring to the axle drive force map, based on the APS and the vehicle speed. A target axle drive torque Tpd is then computed by multiplying the target drive force by the radius of the wheel 5.

In a target drive power computation part 17, the target axle drive torque Tpd is multiplied by an axle rotation speed found from the vehicle speed signal, thus giving a target drive power Ppd.

In a target engine power computation part 18, a target engine power Peng is found by referring to a target engine power map, based on the SOC of the battery 6 found by the battery controller 10 and the target drive power Ppd. Fuel is injected when the target engine power Peng is equal to or greater than zero, with an engine fuel cutoff flag feng set to zero. When the target engine power Peng is less than zero, the engine fuel cuttoff flag feng is set to one, and fuel is cutoff.

The target engine power map will now be explained.

Provided that the target drive power Ppd can be achieved without consuming power from the battery 6, the target engine power Peng is found by the following equation, considering a loss portion of the energy generated by the power generating motor 2 and the drive motor 3.

[Target engine power *Peng*]=[Target drive power *Ppd*]+[loss of energy generated by the power generating motor 2]+[loss of energy generated by the drive motor 3].

However, in practice changing or discharging of the battery 6 is accompanied. A charge and discharge electric power is thus added to get the target engine power, based on the SOC of the battery 6, in order to compensate for the expended electric power. When the SOC is small, the larger the target drive power becomes, the larger the target engine power is increased so that the amount of power generated by the power generating motor 2 increases and can be used to charge the battery 6. On the other hand, the output of the drive motor 3 can be increased when the SOC is large. Accordingly, the output of the drive motor 3 is increased when the target drive power becomes larger, while an increase in the target engine power is suppressed.

The target engine power map is set according to the characteristics of the hybrid electric vehicle as described above.

In an engine torque command value output part 19, the target engine power Peng is divided by the actual engine speed detected by a crank angle sensor of the engine 1, thus finding an engine torque command value Te. The engine torque command value Te is sent to the engine controller 7 together with the engine fuel cutoff flag feng. The engine controller 7 controls the throttle opening of the engine 1, the amount of fuel injected, and the fuel injection timing, based on the engine torque command value Te and the engine fuel cutoff flag feng.

In an engine speed command value output part 20, an engine speed having the least amount of fuel consumption from among all engine speeds at which it is possible to output the target engine power Peng is found based on a best fuel consumption table. This speed is taken as an engine speed command value Ne.

The engine speed command value Ne is processed by a filter 22. A time constant $\tau$ of the filter 22 is found by a time constant output part 21. The time constant output part 21 outputs a time constant A that delays the engine response when an actual speed sNg of the power generating motor 2 is positive, and outputs a time constant B that quickens the engine response when the actual speed sNg of the power generating motor 2 is negative. It should be noted that the actual speed sNg of the power generating motor 2 is detected by a rotary encoder that is built into the power generating motor 2.

In a power generating motor speed converter part 23, the engine speed command value Ne that has been processed by the filter 22 is converted into the speed of the power generating motor 2, and a power generating motor speed command value Ng is then found. The conversion is based on the relationship between $\alpha$ and $\beta$ shown by the collinear diagram of FIG. 3, and an actual speed Nm of the drive motor 3. The power generating motor speed command value Ng is given by the following equation.

$$Ng = -\frac{\alpha \times Nm - (\alpha + \beta) \times Ne}{\beta}$$

The difference between the power generating motor speed command value Ng and the actual speed sNg of the power generating motor is then found in a computation part 24. A power generating motor torque command value Tg is then found by a power generating motor torque computation part 25 so that the actual speed sNg of the power generating motor becomes equal to the power generating motor speed command value Ng. In other words, the power generating motor torque command value Tg is found so that the difference between the power generating motor speed command value Ng, computed by the power generating motor speed converter part 23, and the actual speed sNg of the power generating motor becomes zero. The power generating motor torque command value Tg is sent to the power generating motor controller 8, which controls the size and the rotation direction of the torque from the power generating motor 2.

On the other hand, a target drive torque command value Tmd on a drive motor shaft is found in a division part 26 by dividing the target axle drive torque Tpd by a final gear ratio Gf of the final gear 4. A drive motor torque command value Tm is found in a drive motor torque computation part 27 from the power generating motor torque command value Tg and the target drive torque command value Tmd, based on the collinear diagram of FIG. 3. In other words, the drive motor torque command value Tm can be expressed by the following equation.

$$Tm = Tmd - \frac{\alpha}{\beta} \times Tg$$

An estimated torque of the power generating motor 2 may also be used as a substitute for the power generating motor torque command value Tg, as may an estimated torque of the engine 1. When an estimated torque Te' of the engine 1 is used, the drive motor torque command value Tm can be expressed by the following equation.

$$Tm = Tmd - \frac{\alpha}{\alpha + \beta} \times Te'$$

The drive motor torque command value Tm is sent to the drive motor controller 11, which controls the size and the rotation direction of the torque from the drive motor 3.

Reasons why the fuel consumption can be reduced by this type of control will now be explained.

With the structure of FIG. 2, it is necessary to output a torque from the power generating motor 2 that suppresses engine torque in order to make the engine speed into a desired value. Accordingly, energy losses always occur with the power generating motor 2. The size of the energy losses of the power generating motor 2 is proportional to the size of power generated or consumed power generating motor 2. Both the generated power and the consumed power take on minimum values when the rotating speed of the power generating motor 2 is zero, and the energy loss is a minimum at this time.

Referring to FIG. 3, it can be seen that, in the vicinity of engine speeds that are actually used, changes in the rotation speed of the power generating motor 2 due to changes in the engine speed are larger than changes in the rotation speed of the engine 1 and changes in the rotation speed of the drive motor 3. The rotation speed of the power generating motor 2 is proportional to the energy loss, the rotation speed of the engine 1 is proportional to the fuel consumption, and the rotation speed of the power generating motor 3 is proportional to the energy loss. The energy loss of the power generating motor 2 due to changes in the rotation speed of the power generating motor 2 therefore becomes a controlling factor in the overall system efficiency. Suppressing the energy loss of the power generating motor 2 as much as possible therefore reduces the energy loss of the entire system.

Figure 5B:
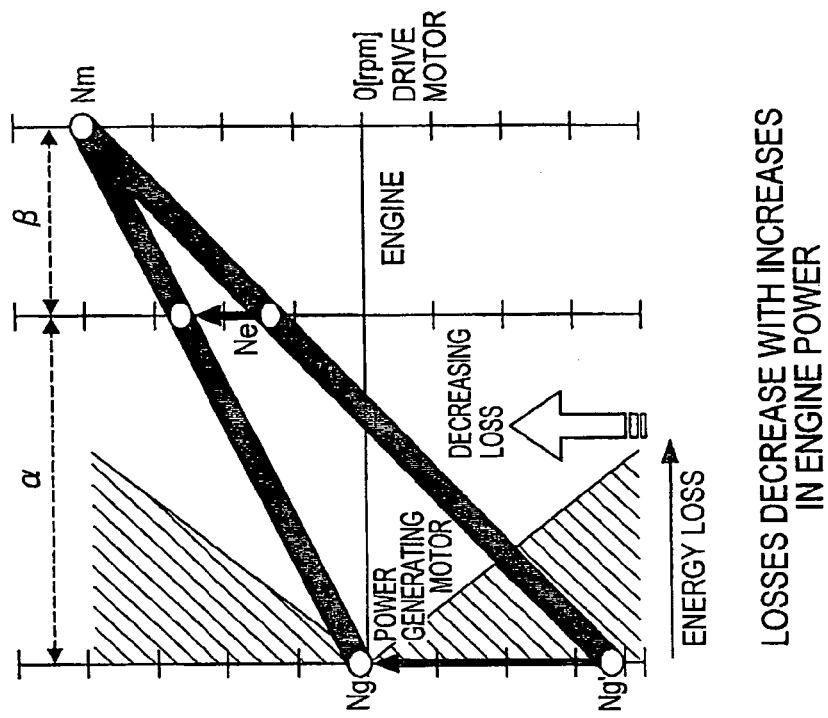
FIGS. 5A and 5B are diagrams which explain losses in the power generating motor.
Figure 5A:
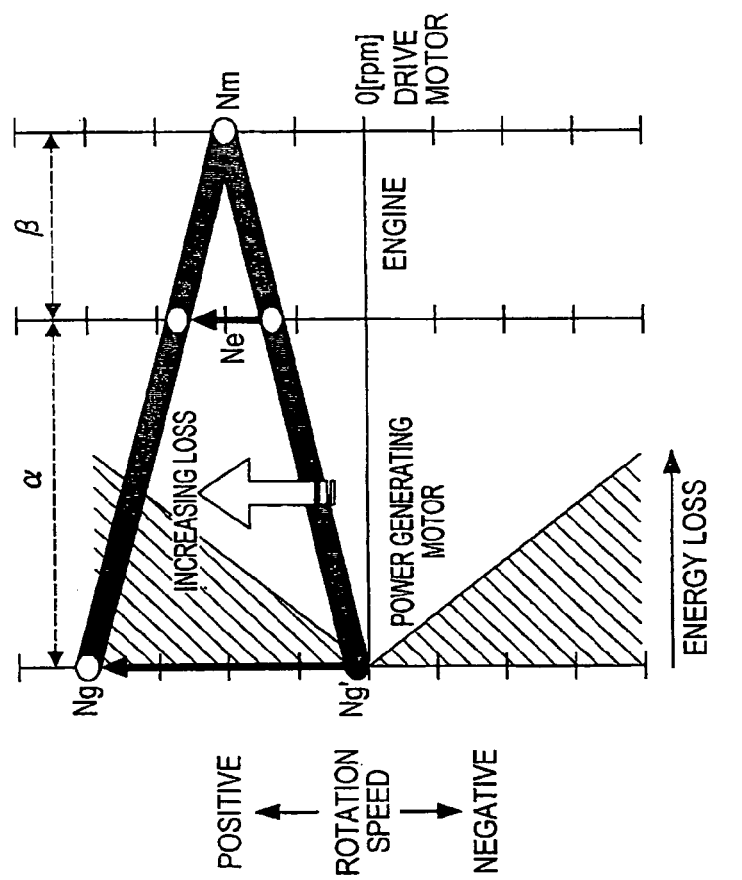

Next, collinear diagrams of FIGS. 5A and 5B will be explained. Hatched regions in FIGS. 5A and 5B show energy losses that occur with the power generating motor 2. There is no energy loss when the rotation speed of the power generating motor 2 is zero. However, the energy loss that occurs with the power generating motor 2 becomes greater with increasing rotation speed of the power generating motor 2, either in a positive or a negative direction.

FIG. 5A shows rotation of the power generating motor 2 in a positive direction. The energy loss that occurs with the power generating motor 2 increases when the rotation speed of the power generating motor 2 is increased, to increase the engine speed. Therefore, in this case, slowly increasing the rotation speed of the power generating motor 2, thus slowly increasing the engine speed, reduces the energy loss of the overall system.

FIG. 5B shows rotation of the power generating motor 2 in a negative direction. When the engine speed is increased by decreasing the negative rotation speed of the power generating motor 2 towards zero, the energy loss that occurs with the power generating motor 2 decreases. Therefore, in this case, quickly decreasing the negative rotation speed of the power generating motor 2 towards zero, thus quickly increasing the engine speed, reduces the energy loss of the overall system.

Referring to FIG. 4, the time constant τ of the filter 22 is determined based on the actual speed sNg of the power generating motor. The rotation speed of the power generating motor 2 is thus slowly changed when the power generating motor 2 is increasing the rotation speed, either in the positive or the negative direction, and the speed of the power generating motor 2 is thus quickly changed when the power generating motor 2 is decreasing the rotation speed towards zero. Accordingly, the energy loss of the overall system that occurs during speed changes can be reliably reduced, and the fuel consumption can be reduced.

Further, increases and decreases in the energy loss of the power generating motor can be judged from the variation of the motor rotation speed, and the speed at which the engine speed is changed can be determined. Consequently, it is not necessary to compute motor losses.

Figure 6:
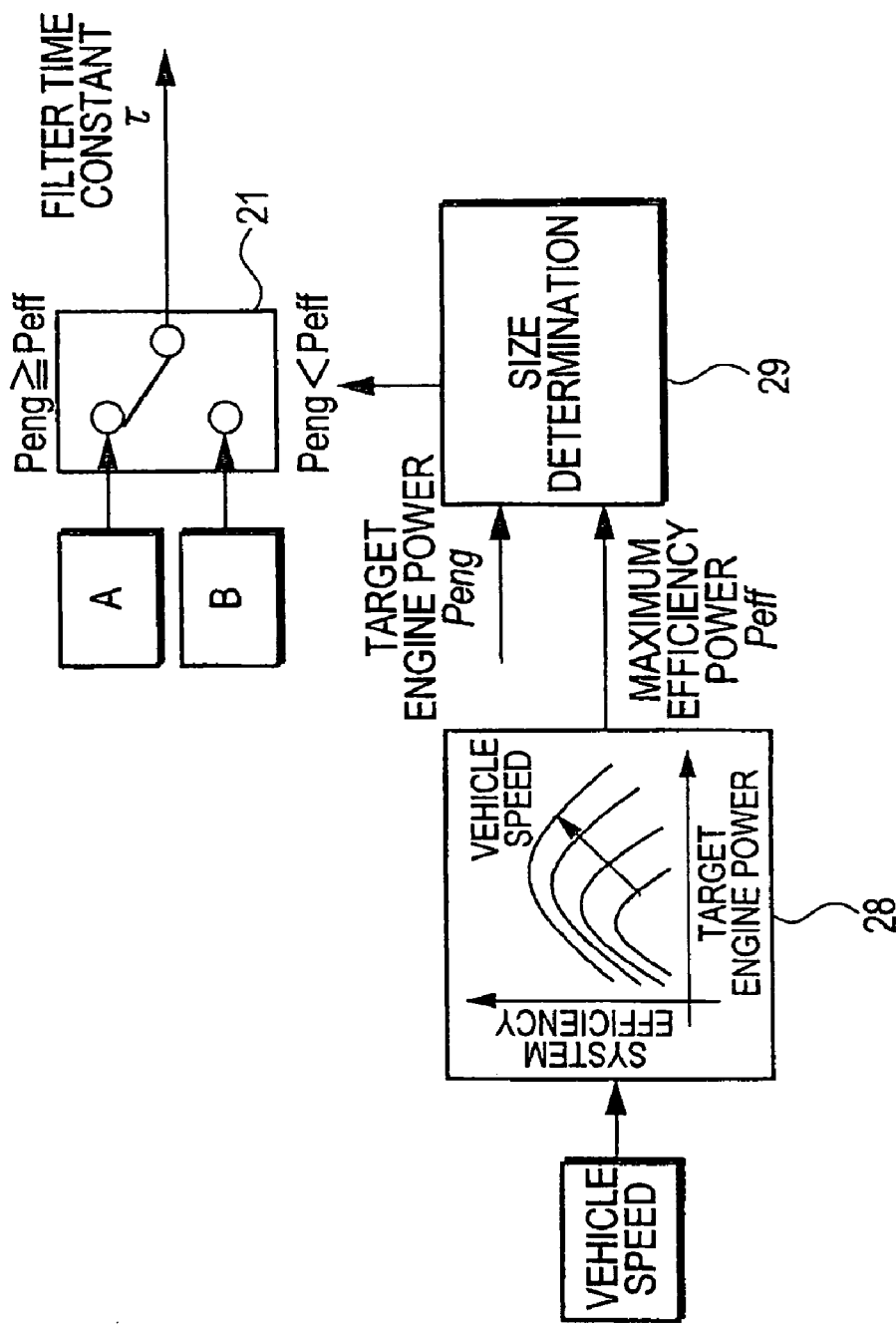
FIG. 6 is a block diagram which explains the structure of a second embodiment of this invention, relating to a time constant output part of the integrated controller.

Referring to FIG. 6, a second embodiment of this invention will be explained.

In the second embodiment, a part surrounded by a broken line of FIG. 4 of the first embodiment is changed into the configuration shown in FIG. 6. Herein, an engine power at which the efficiency of the overall system becomes a maximum is found by a maximum efficiency power computation part 28, based on vehicle speed. The engine power is taken as a maximum efficiency power Peff. The target engine power Peng and the maximum efficiency power Peff are then compared in a size determination part 29. When the target engine power Peng is equal to or greater than the maximum efficiency power Peff, the time constant A corresponding to a large response delay is set. When the target engine power Peng is less than the maximum efficiency power Peff, the time constant B corresponding to a small response delay is set.

Consider factors other than the energy loss of the power generating motor 2, such as the fuel consumption of the engine 1, and the overall energy loss that occurs within the system, from the energy loss of the drive motor 3 and the like. The energy loss decreases by setting the time constant B when changing the operating state of the engine so that the system efficiency becomes higher, or in other words, so that the overall energy loss becomes smaller. The energy loss decreases by setting the time constant A when changing the operating state of the engine so that the system efficiency becomes lower, or in other words, so that the overall energy loss becomes larger.

The energy loss of the overall system that occurs during speed changes can thus be reliably decreased, and the fuel consumption can be decreased.

Figure 7:
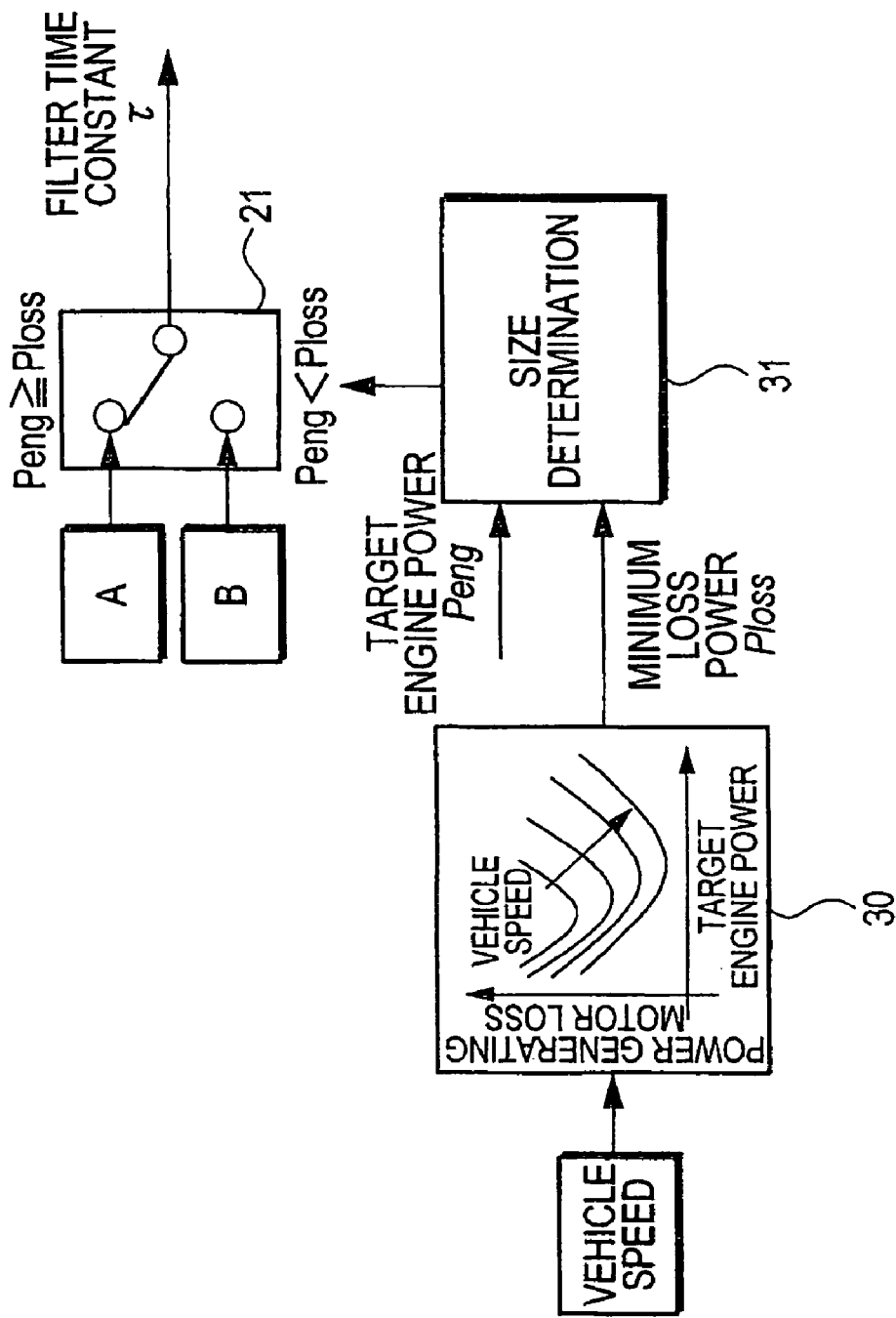
FIG. 7 is similar to FIG. 6, but shows a third embodiment of this invention.

Referring to FIG. 7, a third embodiment of this invention will be explained.

The time constant τ is switched according to the speed of the power generating motor 2 in the first embodiment described above. In the third embodiment, however, the energy loss of the power generating motor 2 is found directly, and then the time constant τ is set. First, an engine power at which the energy loss of the power generating motor 2 becomes a minimum is found by a minimum loss power computation part 30. Herein, the energy loss of the power generating motor 2 is determined based on the vehicle speed. The engine power thus found is taken as a minimum loss power Ploss. The target engine power Peng and the minimum loss power Ploss are then compared in a size determination part 31. When the target engine power Peng is equal to or larger than the minimum loss power Ploss, the time constant A corresponding to a large response delay is set. When the target engine power Peng is less than the minimum loss power Ploss, the time constant B corresponding to a small response delay is set.

The speed at which the engine speed is changed is thus determined by only the energy loss of the power generating motor 2, the most controlling factor of the energy loss of the overall system. Accordingly, the energy loss of the overall complex system need not be computed online.

Figure 8:
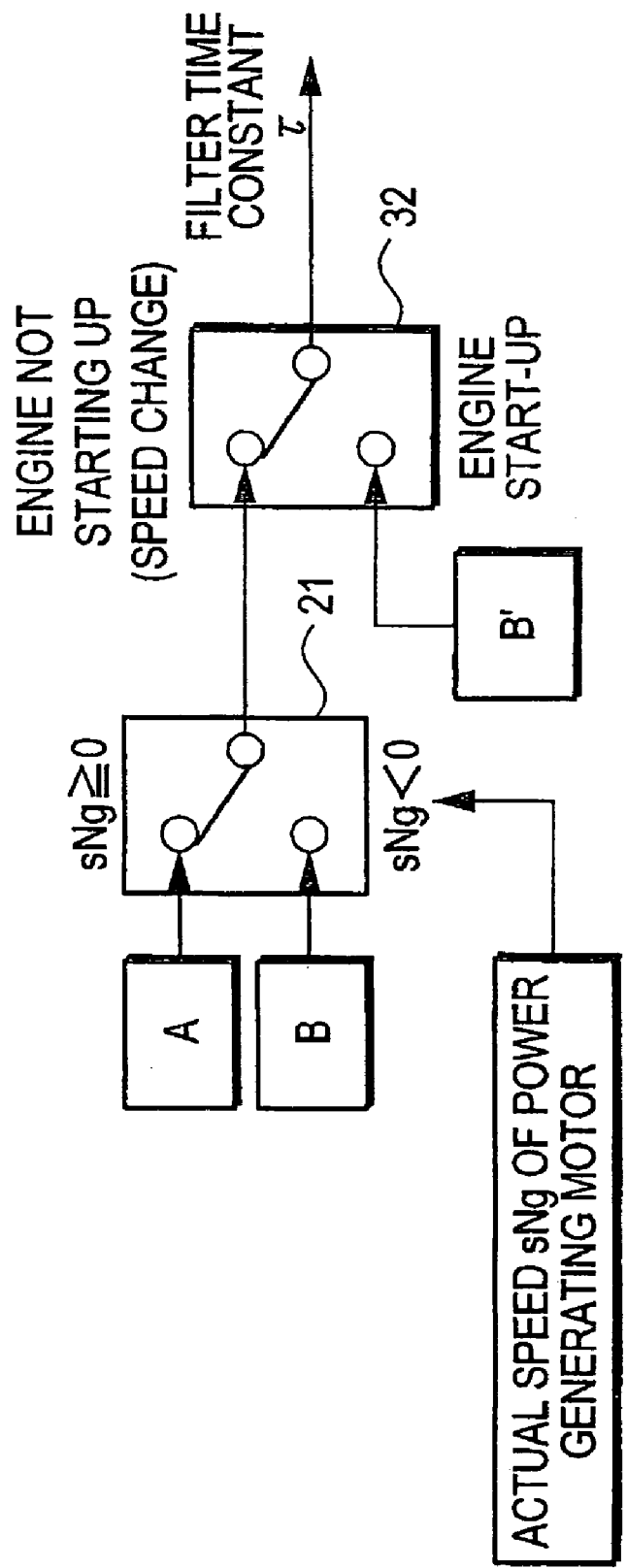
FIG. 8 is similar to FIG. 6, but shows a fourth embodiment of this invention.

Referring to FIG. 8, a fourth embodiment of this invention will be explained.

In the fourth embodiment, after the time constant output part 21 determines the time constant, a time constant B' corresponding to a small response delay is forcibly applied at a time constant correction 32 provided that the engine is starting up. The time constant B' may have or may not have the same value as the time constant B.

According to this embodiment, a time constant corresponding to a small response delay is always applied irrespective of the selection of the time constant by the part 21, when the engine is starting up. An operation state in which the fuel consumption is conspicuously poor can thus be reliably prevented during when the engine is starting up, and the fuel consumption can be reduced.

Figure 9:
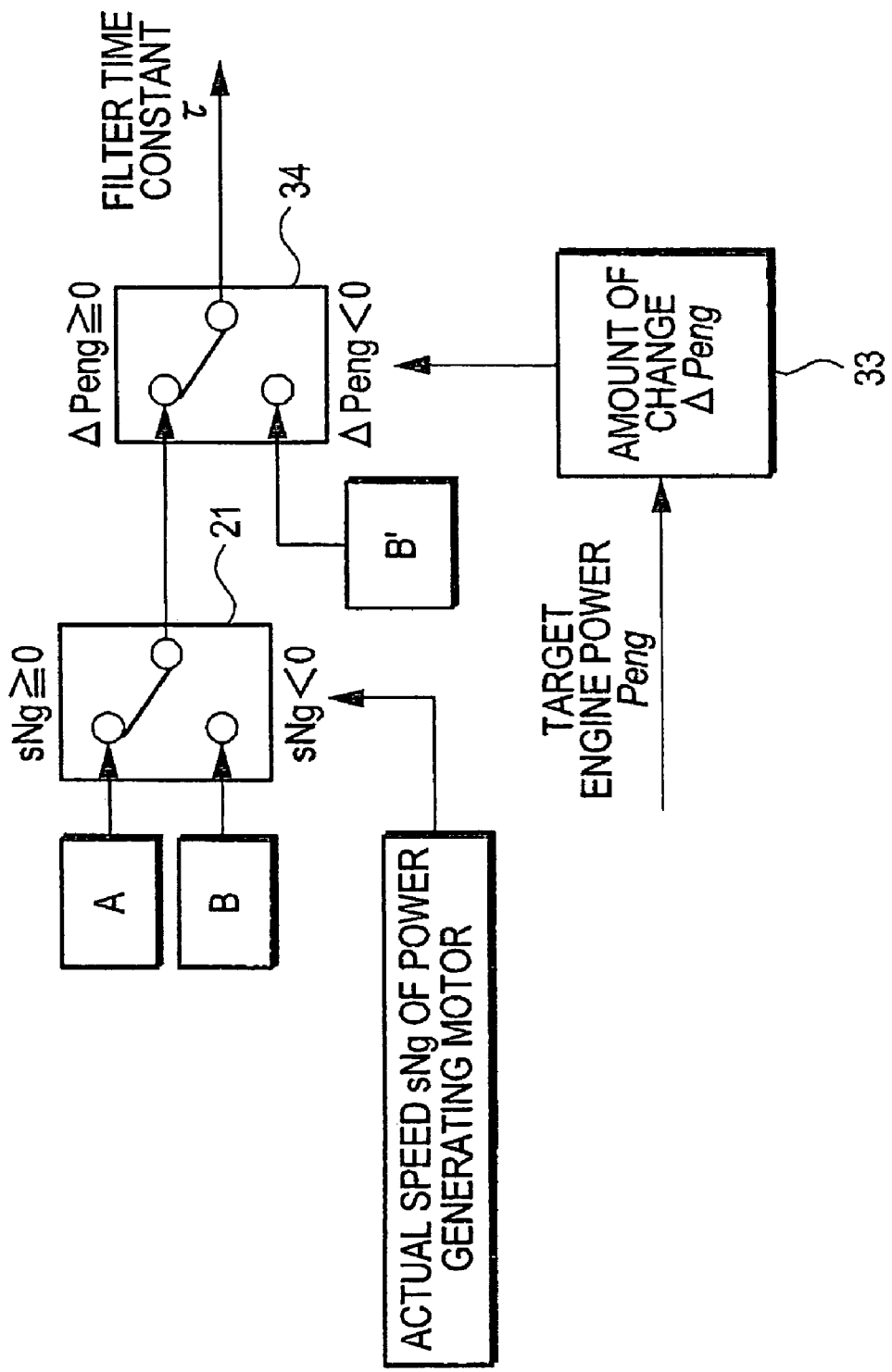
FIG. 9 is similar to FIG. 6, but shows a fifth embodiment of this invention.

Referring to FIG. 9, a fifth embodiment of this invention will be explained.

After the time constant output part 21 determined the time constant, a determination is made at a determining part 33 as to whether the target engine power Peng is increasing or is decreasing. When the target engine power Peng is increasing, the output of the time constant output part 21 is applied. When the target engine power Peng is decreasing, a time constant B' corresponding to a small response delay is forcibly applied irrespective of the selection of the time constant by the part 21. The time constant B' may have or may not have the same value as the time constant B.

Remaining for a long time in operation state in which the fuel consumption is conspicuously poor can thus be reliably prevented, and the fuel consumption can be decreased, when the target engine power Peng decreases and the engine speed decreases.

Figure 10A:
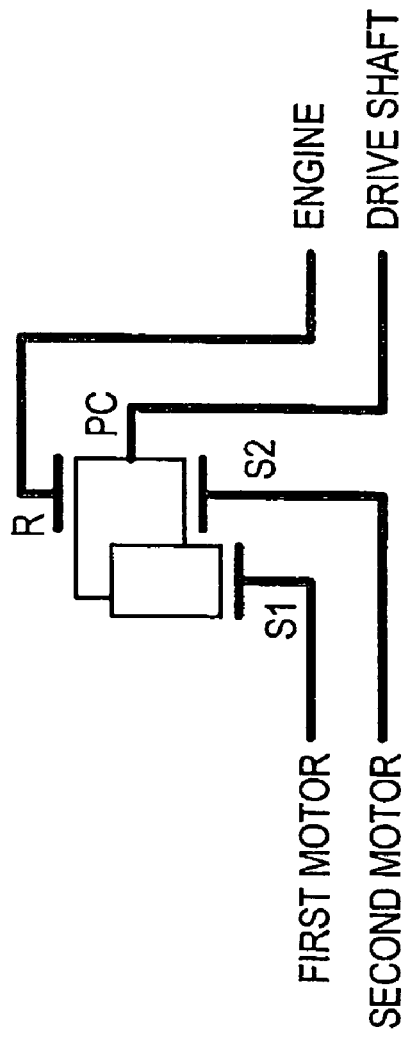
FIGS. 10A and 10B are diagrams showing a vehicle drive system to which this invention can be applied.
Figure 10B:
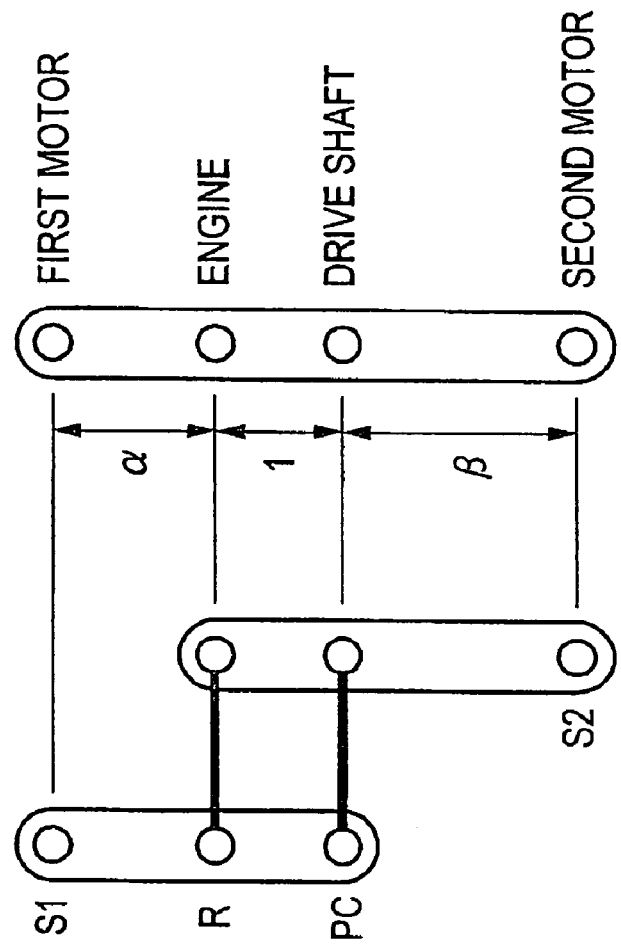

This invention can also be applied to a simplified drive system in which the drive motor that is connected to the ring gear in FIG. 1 is omitted, and to a system in which a plurality of planetary gear sets shown in FIGS. 10A and 10B are combined. In the system of FIGS. 10A and 10B, a first motor is connected to a first sun gear S1, and a second motor is connected to a second sun gear S2. A drive shaft is connected to a pinion and carrier PC. An engine is connected to a ring gear R. Gear ratios for the first sun gear S1 and the second sun gear S2 with respect to the pinion are α and β, respectively. The first motor may be a power generating motor, or the second motor may be a power generating motor.

The contents of Tokugan 2003-356511 with a filling date of Oct. 16, 2003 in Japan are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

The embodiments of this invention in which an exclusive property or privilege is claimed are defined as follows:

What is claimed is:

1. A hybrid electric vehicle comprising:
    a drive wheel;
    an internal combustion engine;
    a power generating motor that generates an electric power by using an output power of the engine;
    a planetary gear set comprising a combination of a gear element that is driven by the engine, a gear element that is connected to the power generating motor, and a gear element that is connected to the drive wheel;
    an accelerator position sensor that detects a depression amount of an accelerator pedal; and
    a programmable controller programmed to:
    compute a target axle drive torque based on the depression amount of the accelerator pedal;
    compute a target engine power based on the target axle drive torque;
    control the engine based on the target engine power; and
    control a rate of variation in the rotation speed of the engine to be smaller, when the rotation speed of the power generating motor is increasing than when the rotation speed of the power generating motor is decreasing toward zero as a result of controlling the engine based on the target engine power.

2. The hybrid electric vehicle as defined in claim 1, wherein the vehicle further comprising;
    a drive motor that is connected to the drive wheel; and
    a drive motor control part that controls output from the drive motor based on the target axle drive torque.

3. The hybrid electric vehicle as defined in claim 1, wherein the controller is further programmed to decrease the rate of increase in the rotation speed of the engine as the rotation speed of the power generating motor increases.

4. The hybrid electric vehicle as defined in claim 1, wherein the controller is further programmed to increase the rate of increase in the rotation speed of the engine per unit time is made larger when the engine is starting up.

5. The hybrid electric vehicle as defined in claim 1, wherein the controller is further programmed to increase the rate of increase in the rotation speed of the engine per unit time is made larger when the target engine power decreases.

6. A hybrid electric vehicle comprising:
    a drive wheel;
    an internal combustion engine;
    a power generating motor that generates an electric power by using an output power of the engine;

a planetary gear set comprising a combination of a gear element that is driven by the engine, a gear element that is connected to the power generating motor, and a gear element that is connected to the drive wheel;

means for detecting accelerator depression amount of an accelerator pedal;

means for computing a target axle drive torque based on the depression amount of the accelerator pedal;

means for computing a target engine power based on the target axle drive torque;

means for controlling the engine based on the target engine power; and means for controlling a rate of variation in the rotation speed of the engine to be smaller, when the rotation speed of the power generating motor is increasing than when the rotation speed of the power generating motor is decreasing toward zero as a result of controlling the engine based on the target engine power.

* * * * *